US008182921B2

(12) United States Patent
Weidinger

(10) Patent No.: US 8,182,921 B2
(45) Date of Patent: May 22, 2012

(54) SELF-ADHESIVE EXPANDABLE SILICONE COMPOSITIONS FOR THE PRODUCTION OF SILICONE FOAM COMPOSITE PARTS

(75) Inventor: Juergen Weidinger, Muenster (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 12/743,947

(22) PCT Filed: Nov. 21, 2008

(86) PCT No.: PCT/EP2008/065975

§ 371 (c)(1), (2), (4) Date: May 20, 2010

(87) PCT Pub. No.: WO2009/068478

PCT Pub. Date: Jun. 4, 2009

(65) Prior Publication Data

US 2010/0310852 A1 Dec. 9, 2010

(30) Foreign Application Priority Data

Nov. 26, 2007 (DE) ........................ 10 2007 047 864

(51) Int. Cl.

*B32B 9/04* (2006.01)
*C08L 83/04* (2006.01)

(52) U.S. Cl. ........... 428/447; 521/84.1; 521/92; 521/91; 521/154; 524/21; 524/27; 524/401; 524/417; 524/423; 524/588; 528/15; 528/24; 528/31; 528/32; 528/34

(58) Field of Classification Search ........................ None
See application file for complete search history.

(56) References Cited

U.S. PATENT DOCUMENTS 4,719,249 A * 1/1988 Dietlein et al. ............... 523/179
5,246,974 A * 9/1993 Jonas et al. ..................... 521/82
5,508,321 A * 4/1996 Brebner ........................ 523/179
5,612,386 A * 3/1997 Ertle et al. ...................... 521/91
5,744,507 A * 4/1998 Angell et al. .................. 521/86
6,743,515 B1 6/2004 Müller et al.
7,078,453 B1 7/2006 Feeney et al.
2001/0011117 A1 8/2001 Pesch et al.
2008/0064776 A1 * 3/2008 Weidinger ...................... 521/85
2008/0281007 A1 11/2008 Weidinger et al.

FOREIGN PATENT DOCUMENTS

DE 4101884 A1 7/1992
EP 0686671 A2 12/1995
EP 0875536 A2 11/1998
EP 1106662 B1 1/2004
GB 1273468 A 5/1972
JP 63282381 A 11/1988
JP 07292504 A 11/1995
KR 20010077825 A 8/2001
WO 2007054463 A1 5/2007

OTHER PUBLICATIONS entry from Hawley's Condensed Chemical Dicitionary, 14th Edition (2002) for the word "silicate".*

* cited by examiner

*Primary Examiner* — Marc Zimmer
(74) *Attorney, Agent, or Firm* — Brooks Kushman P.C.

(57) ABSTRACT

Crosslinkable compositions containing a crosslinkable organosilicon compound; a silica filler; a silicate or halogen analog thereof, a non-silicate resin-forming monomer; and a solid blowing agent containing intercalated liquid or liquid of crystallization, produce uniform foams of good pore structure, with firm adhesion to substrates, with water repellency and water vapor permeability, and with high elongation and low compression set, and are suitable for use in applications where foamed chloroprene rubber has been used, and in other applications as well.

18 Claims, No Drawings

SELF-ADHESIVE EXPANDABLE SILICONE COMPOSITIONS FOR THE PRODUCTION OF SILICONE FOAM COMPOSITE PARTS

CROSS-REFERENCE TO RELATED APPLICATION

This application is the U.S. national phase of PCT Appln. No. PCT/EP2008/065975 filed Nov. 21, 2008 which claims priority to German application DE 10 2007 047 864.1 filed Nov. 26, 2007.

BACKGROUND OF THE INVENTION

1. Field of the Invention

The invention relates to self-adhesive, expandable silicone compositions, to their preparation, and to the materials obtained by expansion and crosslinking.

2. Description of the Related Art

Self-adhesive silicones are a challenge to the developer, since the surface energy and morphology of silicones means that they tend to be inert with respect to adhesion. Consequently there are only a few studies on this topic in which the silicone composition is modified in an attempt to impart adhesion to the silicone polymer (polysiloxane) in order to avoid preliminary work which is laborious and is hampered by uncertainties, such as, for example, pretreatment, priming, etc., as disclosed in specifications EP 1 106 662 B1, EP 0 686 671 A2, and EP 0 875 536.

The automatic production of silicone foam composite articles—that is, of parts which come about through automatic adhesion of expanded silicone to the support material—is desirable from the standpoints of economy and environment (no solvent load as a result of primers; energy saving), but has not been successfully achieved to date. There are a number of reasons for this.

1. The development of voids (bubbles) hinders the migration of adhesion promoters to the support (substrate) surface, which is necessary for the development of adhesion, or greatly prolongs, and at the same time narrows, the migration pathway.

2. The development of bubbles also weakens the area of contact at the substrate contact area, and massively reduces the possible surface area for the development of adhesion.

3. In many cases, the blowing agents used for expansion enter into chemical and/or physical interaction with the adhesion promoters, and, as a result, their effect is negatively influenced.

In the apparel and textile industries, for the purposes of insulation and of protection, expanded laminates or inserts are frequently used for the manufacture of products.

These inserts or laminates of functional clothing, with properties of insulation or of shielding in some other way, are nowadays manufactured most commonly from foamed chloroprene rubber (CR hereinbelow), also known under the name Neoprene®. CR is an organic rubber containing halogen (chlorine). On account of this, its decomposition or degradation is accompanied by release of toxic hydrogen chloride. Chloroprene, moreover, is vulcanized using intensely odorless and highly chemically reactive—that is, controversial—crosslinkers. The complete removal of the latter or the full removal of the by-products from the vulcanisate (rubber) is chemically and physically impossible. The expansion (foaming) of chloroprene likewise takes place using chemically reactive, intensely odorous, and controversial agents. The removal of the by-products is likewise not completely possible.

Nevertheless, CR is employed above all as a foam in functional clothing, such as diving, swimming, and surfing suits, motorcycle clothing, climbing clothing, skiwear and protective clothing, etc. In these applications, the advantages of CR foam include the following:

- relatively good ozone resistance;
- relatively good salt water resistance;
- lightweight foam;
- acceptable stretch;
- low production costs.

In the absence of functioning alternatives, all of the disadvantages of CR in these applications are tolerated:

- the CR compositions are not free of odor when stored, for example, at slightly elevated temperature; in enclosed spaces, as in an automobile, for example, highly unpleasant odors are given off;
- the CR compositions are not free from reaction derivatives of the vulcanization and expansion;
- the CR compositions are not very resistant to combined, typical outdoor influences such as UV, heat, and cold;
- stabilization against light exposure and heat exposure is possible only with the aid of questionable stabilizers such as loss stabilizers;
- attainment of low, highly stretchable hardness only with the aid of plasticizers, and consequent reduction in resistance and other mechanical parameters;
- mechanically moderate physical property levels with high permanent deformation and hence high tension and compression set;
- low dynamic resistance to combined loading, as in the case of crease loading or tensile loading under heat, under cold, or under exposure to media;
- limited waterproofness, since not water-repellent;
- unpleasant to wear for any duration, on account of very low gas permeability and vapor permeability (U.S. Pat. No. 7,078,453, indeed, describes their use as a gas barrier; they are therefore not breathable, and hence there is accumulation of sweat);
- production of dense, toxic, halogen-containing smoke in the event of fire; less combustible versions possible only with the aid of further halogen (bromine)-containing substances.

Existing uses of foamed, siloxane-containing compositions in the apparel segment have been confined to specialty pieces, as for example laminates, with methods ofproduction that are highly costly and inconvenient overall. For instance, JP 7292504 A2, directed only to the production of swimming caps, applies a silicone foam preform to thermoplastic. KR20010077825 A prefoams a silicone onto wax paper and bonds it to a textile with a previously applied adhesive silicone coating in order to obtain a type of synthetic leather. JP 63282381 A2 takes a similarly arduous route in bonding silicone foam to textile using peroxide-crosslinked (and hence intensely odorous) solid silicone. GB 1273468 A makes reference, inter alia, to silicone foam for laminates which are subsequently impregnated with resin. DE 41 01 884 A1, finally, refers to foam of room-temperature-crosslinking (and therefore very slow) RTV silicone, which is sprayed onto textile.

All of the methods practiced and referred to in the prior art, and all of the claimed materials—including the applications, materials, and methods that are common knowledge, as known from CR—have the following drawbacks in common:

- use of controversial (odor, residues) or low-efficiency (RTV) blowing agents;

uneconomic operations which also contain sources of error, either as a result of costly and inconvenient multistep methods and/or through the use of siloxanes that are slow to crosslink.

SUMMARY OF THE INVENTION

It was an object of the present invention, therefore, to provide silicone compositions which not only are very readily expandable but also, in spite of bubbles being formed, likewise rapidly develop very good adhesion to the substrate, and which do not have the drawbacks described above, such as odor nuisance, low resistance, etc. These and other objects are achieved through the use of a crosslinkable foamable silicone composition containing blowing agents containing intercalated liquid or liquid of crystallization, selected from the group containing salts, silicates, proteins, and sugars.

DETAILED DESCRIPTION OF THE PREFERRED EMBODIMENTS

The invention thus provides a silicone composition comprising (A) at least one organosilicon compound having radicals suitable for crosslinking, (B) at least one reinforcing filler selected from the group containing treated or untreated fumed or precipitated silicas, (C) at least one blowing agent, (D) at least one suitable crosslinking system selected from the group containing condensation crosslinking, peroxide-induced free-radical or noble metal complex-catalyzed addition crosslinking, (E) at least one silicate having thermally or hydrolytically cleavable leaving groups O—$R^7$, selected from the group containing silicate salts or low molecular weight silicate compounds, where $R^7$ is an H, an organic radicals, or in place of O—$R^7$, a halogen as leaving group, (F) at least one resin-forming monomer or oligomer having a linear structure, with the proviso that silicates are not included, characterized in that use is made as blowing agent (C) of a compound containing intercalated liquid or liquid of crystallization, selected from the group containing
salts,
silicates,
proteins, and
sugars.

The compositions of the invention may be either one-component compositions or else multicomponent compositions. In the latter case, the components of the compositions of the invention may comprise all of the constituents in any desired combination.

The silicone-containing compositions of the invention preferably comprise, as constituent (A), an aliphatically unsaturated organosilicon compound, in which case it is possible to employ all aliphatically unsaturated organosilicon compounds that are useful in crosslinking compositions, and also, for example, silicone block copolymers having urea segments, silicone block copolymers having amide segments and/or imide segments and/or ester-amide segments and/or polystyrene segments and/or silarylene segments and/or carborane segments, and silicone graft copolymers having ether groups.

The molecular weight of constituent (A) may vary within wide limits, for instance between $10^2$ and $10^6$ g/mol. Hence constituent (A) may be, for example, a relatively low molecular weight, alkenyl-functional oligosiloxane, such as 1,2-divinyltetramethyldisiloxane, but may also be a high-polymer polydimethylsiloxane, with a molecular weight of $10^5$ g/mol (number-average determined by means of NMR), for example one that possesses non-terminal or terminal Si-bonded vinyl groups. The structure of the molecules that form constituent (A) is also not fixed; in particular, the structure of a siloxane of relatively high molecular weight, i.e., an oligomeric or polymeric siloxane, may be linear, cyclic, branched or else resinous, networklike. Linear and cyclic polysiloxanes are preferably composed of units of the formula $R_3SiO_{1/2}$, $R^1R_2SiO_{1/2}$, $R^1RSiO_{2/2}$, and $R_2SiO_{2/2}$, where R and $R^1$ may be any desired organic or inorganic substituents, preferably halo- and/or organo-substituted linear and branched siloxanes having 1 to 10 Si—O units, more preferably organo-substituted siloxanes having terminal and pendent OH functions that are satisfied by leaving groups. Branched and networklike polysiloxanes additionally contain trifunctional and/or tetrafunctional units, preference being given to those of the formulae $RSiO_{3/2}$, $R^1SiO_{3/2}$, and $SiO_{4/2}$, where R and $R^1$ carry the definition identified above. It is of course also possible for mixtures of different siloxanes that satisfy the criteria for constituent (A) to be used.

As component (A) it is preferred to use vinyl-functional, substantially linear polydiorganosiloxanes having a viscosity of 0.01 to 500,000 Pa·s, more preferably 0.1 to 100,000 Pa·s, and most preferably 100 to 100,000 Pa·s, in each case at 25° C.

The amount of component (A) in the crosslinkable composition of the invention is preferably in the range from 40% to 95% by weight, more preferably 35% to 85% by weight.

As fillers (B) it is possible to use all fillers from the group of the silicas that are useful in silicone-containing compositions. Examples of reinforcing fillers which can be used as component (B) in the compositions of the invention are fumed or precipitated silicas having BET surface areas of at least 50 $m^2/g$, and also carbon blacks and activated carbons, such as furnace black and acetylene black, with preference being given to fumed and precipitated silicas having BET surface areas of at least 50 m2/g.

The stated silica fillers may be hydrophilic in nature or may have been hydrophobicized by known methods. If hydrophilic fillers are incorporated by mixing, it is necessary to add a hydrophobicizing agent.

Particularly preferred as component (B) are silicas which contain free OH groups or OH groups that are substituted by organosilyl resins, and hence which still have a partly hydrophilic character, and/or which are able, through elimination of organic leaving groups (—OMe, OEt, OAc, etc.), to form hydrophilic groups in situ.

The amount of actively reinforcing filler (B) in the crosslinkable composition of the invention is preferably in the range from 0.5% to 70% by weight, more preferably at 5% to 50% by weight.

The components (A) and (B) used in accordance with the invention are commercial products or can be produced by methods that are common in chemistry.

Where salts are used as blowing agents (C), preference is given to alkali metal salts, alkaline earth metal salts, and rare earth metal salts. Particular preference is given to using combinations of cations $Cs^+$, $Rb^+$, $NH_4^+$, $Na^+$, $Li^+$, $Ca^{2+}$, $Ba^{2+}$, $Sr^{2+}$, $Mg^{2+}$, $Al^{3+}$, $Fe^{3+}$, $Cr^{3+}$ with anions $NO_3^-$, $CN^-$, $I^-$, $Br^-$, $F^-$, $CO_3^{2-}$, $SO_4^{2-}$ and polysulfates, $PO_4^{3-}$ and polyphosphates. Particularly preferred anions are $CO_3^{2-}$, $SO_4^{2-}$ and polysulfates, and $PO_4^{3-}$ and polyphosphates.

Where metal silicates are used as blowing agents (C), the silicates in question are preferably phyllosilicates, and more preferably zeolites.

Where proteins are used as blowing agents (C), the proteins in question are preferably those exhibiting a high tendency toward incorporation of liquids, i.e., having a high fraction of hydrogen bonds, independently of the secondary and tertiary structures.

Where sugars are used as blowing agents (C), the sugars in question are preferably dextrose and polysaccharides.

The molecules of liquid that are bound to the blowing agent are selected from the group containing organic and inorganic solvents. Preferably these solvents are selected from the group containing water, alcohols, amines, THF, pentane, hexane, toluene, and ethers, or mixtures thereof. A particularly preferably liquid molecule is water.

Preference is given here to blowing agents which release water or water vapor, and particular preference in turn to those which generate water vapor from water of crystallization or intercalated water. The reasons for this are that 1. water vapor intervenes positively in the adhesion mechanism, and 2. in case of water of crystallization and intercalated water, the release of vapor is smoothed and controlled, and operates simultaneously with the development of adhesion. Moreover, these classes of blowing agent can be readily incorporated homogeneously into the silicone matrix.

The amount of blowing agent (C) in the crosslinkable composition of the invention is preferably in the range from 0.05% to 15% by weight, more preferably at 0.2% to 1% by weight.

As crosslinker systems (D) it is possible to use all peroxide-initiated or noble-metal-complex-catalyzed addition-crosslinking systems and condensation-crosslinking systems known to date in the prior art.

Where the crosslinking of the compositions of the invention takes place by means of free radicals, organic peroxides are used as crosslinking agents, and serve as a source of free radicals. Examples of organic peroxides are acyl peroxides such as dibenzoyl peroxide, bis(4-chlorobenzoyl) peroxide, bis(2,4-dichlorobenzoyl) peroxide, and bis(4-methylbenzoyl) peroxide; alkyl peroxides and aryl peroxides such as di-tert-butyl peroxide, 2,5-bis(tert-butylperoxy)-2,5-dimethylhexane, dicumyl peroxide, and 1,3-bis(tert-butylperoxyisopropyl)benzene; perketals such as 1,1-bis(tert-butylperoxy)-3,3,5-trimethylcyclohexane; and peresters such as diacetyl peroxydicarbonate, tert-butyl perbenzoate, tert-butyl peroxyisopropyl carbonate, tert-butyl peroxyisononanoate, dicyclohexyl peroxydicarbonate, and 2,5-dimethylhexane 2,5-diperbenzoate.

It is possible to use one kind of organic peroxide; it is also possible to use a mixture of at least two different kinds of organic peroxides.

As catalysts which promote the addition of Si-bonded hydrogen to aliphatic multiple bond it is also possible in the process of the invention to use the same catalysts which are useful for promoting the addition of Si-bonded hydrogen to an aliphatic multiple bond. The catalysts preferably comprise a metal from the group of the platinum metals, or a compound or a complex from the group of the platinum metals. Examples of such catalysts are metallic and finely divided platinum, which may be located on supports such as silicon dioxide, aluminum oxide or activated carbon; compounds or complexes of platinum, such as platinum halides, e.g., $PtCl_4$, $H_2PtCl_6.6H_2O$, $Na_2PtCl_4.4H_2O$, platinum-olefin complexes, platinum-alcohol complexes, platinum-alkoxide complexes, platinum-ether complexes, platinum-aldehyde complexes, platinum-ketone complexes, including reaction products of $H_2Pt_6.6H_2O$ and cyclohexanone, platinum-vinylsiloxane complexes such as platinum-1,3-divinyl-1,1,3,3-tetramethyldisiloxane complexes, with or without detectable inorganically bonded halogen; bis(gamma-picoline)platinum dichloride, trimethylenedipyridineplatinum dichloride, dicyclopentadieneplatinum dichloride, dimethylsulfoxide-ethyleneplatinum(II)dichloride, cyclooctadiene-platinum dichloride, norbornadiene-platinum dichloride, gamma-picoline-platinum dichloride, cyclopentadiene-platinum dichloride, and also reaction products of platinum tetrachloride with olefin and primary amine or secondary amine or primary and secondary amine, such as the reaction product of platinum tetrachloride, in solution in 1-octene, with sec-butylamine, or ammonium-platinum complexes.

For improving adhesion, use is made of adhesion promoters or adhesive systems as a combination of components (E) and (F).

As (E) it is possible to use silicate salts or low molecular weight silicate compounds through monomeric silanes which contain thermally/hydrolytically cleavable O—$R^6$ bonds or halogen radicals. Preference is given to silanes of the general formula (1)

$$R^2R^3SiR^4R^5 \quad (1)$$

where $R^2$, $R^3$, $R^4$, and $R^5$ may each be an organic or inorganic radical or a substituent of the structure O—$R^6$ or a halogen radical, where $R^6$ is H or any desired organic radical. With particular preference the radicals $R^2$, $R^3$, $R^4$, and $R^5$ denote a preformed, small and readily eliminable leaving group, such as, for example, —OMe, —OEt, —OAc, etc., or a reactive halogen, such as —Cl, —Br, etc.

In another embodiment, at least one of the radicals, $R^2$, $R^3$, $R^4$ or $R^5$, may be replaced by —O— and so lead to a low molecular weight, three-dimensional continuation of the silicate tetrahedron structure. With preference the low molecular weight silicate compounds are composed of up to 100 Si—O units.

The amount of component (E) in the crosslinkable composition of the invention is in the range from 0.3% to 30% by weight, preferably 1% to 10% by weight.

The compounds (F) preferably conform preferably to the general formula (2)

$$R^8R^9(R^{10}O)Si—OR^{11} \quad (2)$$

where $R^8$ and $R^9$ may be any desired organic or inorganic substituents, preferably halogen- and/or organo-substituted linear and branched siloxanes having 1 to 10 Si—O units, more preferably organo-substituted siloxanes having terminal and pendent OH functions satisfied by leaving groups. $R^{10}$ and $R^{11}$ may likewise be any desired organic or inorganic compounds, but with the proviso that at least one of the two has a preformed leaving group, i.e., a substituent —$CH_3$, —$CH_2CH_3$, —C(O)$CH_3$, etc. Preference as radicals $R^{10}$ and $R^{11}$ is therefore given to short-chain organic compounds, more preferably methyl, ethyl, or acetyl groups.

The amount of component (F) in the crosslinkable composition of the invention is in the range from 0.1% to 20% by weight, preferably 0.5% to 5% by weight.

The compounds (E) may react with compounds (F) to form relatively highly condensed adhesion systems.

For incorporation into a peroxide-induced system or a system addition-crosslinked with platinum catalysis, the compounds (B), (E), and (F) may further contain vinyl groups, as $R^2$ or $R^8$, for example.

The compounds (E) and (F) used in accordance with the invention are known to a person skilled in the art and in some cases are commercially available.

As further constituents of the composition there may be compounds (G) present that are conducive to the development of adhesion, such as hydrosilanes and hydrosiloxanes, hydroxysiloxanes, glycidyloxypropyl-trimethoxysilane (Glymo), etc.

Activators (H) as well may be present in the composition as and when needed, and accelerate or catalyze the crosslinking behavior of the adhesion promoters. (H) therefore encompasses all compounds, individually or in any desired combination, which, in the context of a base or acid-catalyzed esterification or transesterification, as a first step or sub-step in a polycondensation, are able to act as a base or acid, respectively. Preference is given here to mild acids and bases in solid form, as ammonium salts, phosphates, sulfates, acetates, etc. The function of the activators lies in the catalysis of the crosslinking reaction, as mentioned; however, they may also leave, through an influence exerted on the pH of the matrix, to accelerated expulsion of gases from the blowing agent systems (e.g., $CO_2$ from carbonates, water vapor from intercalation compounds), which allows the development of adhesion and the expansion to be coupled through the activators. The starting materials (H) are known to those skilled in the art and may in some cases be purchased.

Besides components (A) to (H), the compositions of the invention may further comprise any other substances useful for the production of silicone-containing compositions, including those substances which have been used to improve adhesion and expansion behavior.

The silicone-containing compositions of the invention may optionally comprise as constituent (I) further additives, in a fraction of up to 10% by weight, preferably 0.0001% to 4% by weight, which may act as a catalyst, cocatalyst or initiator for cleavage reactions and condensation reactions of O—$R^6$ bonds, such as:

- metal complexes or noble-metal complexes, preferably complexes with tetraorganic substitution, more preferably tetraorganically substituted tin complexes, titanium complexes, and zirconium complexes;
- acidic or basic, ionic and nonionic compounds, such as alkali metal salts and alkaline earth metal salts of organic and inorganic acids and bases, preferably acetates, sulfonates, sulfates, and phosphates, and ammonium salts;
- all other organic and inorganic compounds which are capable of destabilizing O—$R^6$ bonds, of cleaving such bonds, or of catalyzing their cleavage or destabilization.

The silicone-containing compositions of the invention may optionally comprise as constituent (K) further additives, in amounts up to 70% by weight, preferably 0.0001% to 40% by weight. These additives may be, for example, inert fillers, microwave-active fillers for the simultaneous vulcanization and expansion through targeted excitation, resinous polyorganosiloxanes, which are different from the siloxanes (A), (E), (F) (i.e., are not causally adhesion-promoting), dispersing assistants, solvents, adhesion promoters, pigments, dyes, plasticizers, organic polymers, heat stabilizers, etc. These include additives such as finely ground quartz, diatomaceous earth, clays, chalk, lithopones, carbon blacks, graphite, metal oxides, metal carbonates, metal sulfates, metal salts of carboxylic acids, metal dusts, fibers, such as glass fibers, plastics fibers, plastics powders, metal dusts, dyes, pigments, etc.

Additionally present may be additives (L) which serve for the targeted adjustment of the processing life, onset temperature, and crosslinking rate, and also of the response to methods of crosslinking, such as UV and IR radiation.

The organopolysiloxane compositions of the invention may if necessary be emulsified, suspended, dispersed or dissolved in liquids. The compositions of the invention may—in accordance in particular with the viscosity of the constituents and with the filler content—be of low viscosity and pourable, have a pasty consistency, be powderous, or else constitute smooth, highly viscous compositions, which as is known may be the case for the compositions referred to in technical circles frequently as RTV-1, RTV-2, LSR, and HTV. With regard to the elastomeric properties of the crosslinked silicone compositions of the invention, as well, the entire spectrum is covered, beginning with extremely soft silicone gels, through rubberlike materials, and onto highly crosslinked silicones with glasslike behavior.

Particularly preferred compositions are those which are amenable to processing in the methods of injection molding, of extrusion, of calendering, and of coating, i.e., compositions known commonly as liquid silicone or solid silicone or LSR or HTV or HCR, and also, for coating, compositions which are known as RTV or LSR.

The silicone-containing compositions of the invention may be prepared by known processes, as for example by uniform mixing of the individual components. The sequence in this case is arbitrary. Mixing here takes place, as a function of the viscosity of (A), with, for example, a stirrer, in a dissolver, on a roll or in a kneading device. The filler (B), the additives (C), (D), (E), and (F), and also, if desired, (G) to (L), may also be encapsulated in an organic thermoplastic or in a thermoplastic silicone resin, with the proviso that there are still groups for cleavages of O—$R^6$ bonds available on the particle surface.

The components (A) to (L) used in accordance with the invention may in each case constitute a single kind of such a component, or else a mixture of at least two different kinds of such a component.

Where crosslinkable groups are present, the compositions of the invention may be crosslinked (vulcanized), like conventionally known crosslinkable compositions. This preferably involves temperatures of 40 to 220° C., more preferably of 100 to 190° C., and either atmospheric pressure or else a pressure of 900 to 1100 hPa. It is, however, also possible to apply higher or lower temperatures and pressures. Crosslinking may also be carried out photochemically using high-energy radiation, such as visible light with short wavelengths, and UV light, for example, or with a combination of thermal and photochemical excitation.

The present invention further provides expanded extrudates, laminates, and expanded composite moldings, generally produced by crosslinking and expansion of the compositions of the invention, by means, for example, of extrusion, calendering, overmolding, mold casting, compression molding, laminating, and adhesive bonding, with or without exposure to pressure.

The compositions of the invention and also the expanded crosslinked products produced from them in accordance with the invention can be employed for all purposes, with the advantage of economic, very largely automated, continuous, and error-minimized foam composite part production, for which elastomers, or organopolysiloxane compositions which can be crosslinked to elastomers, are useful. Encompassed by these purposes, for example; are silicone foam coating and/or impregnation of any desired substrates, the production of foam moldings, for example by injection molding, vacuum extrusion, extrusion, mold casting, and compression molding methods; impressions, use as sealants, potting compounds, and encapsulating compounds, adhesives, laminates, calendered products, composite bodies and moldings—also in multiple and/or combined execution of the processing methods, such as multiple laminating, laminating and adhesive bonding, extruding and overmolding, and so on.

The compositions of the invention have the advantage that they can be prepared in a simple process, using readily available starting materials, without risk of adverse mutual influence, and hence economically and safely.

The compositions of the invention have the advantage that, by virtue of the combined heat-induced crosslinking and expansion, they allow rapid and economic production of expanded articles.

The compositions of the invention have the further advantage that, when made self-adhesive by means of appropriate additives (adhesion promoters), they enable the automatic, safe, and economic production of composite parts, laminates, and calendered product, without preliminary work and pretreatment.

The compositions of the invention have the advantage that their foamed vulcanisates, on account of the low thermal conductivity of the silicones, which is lowered still further by foaming, have very good heat- or cold-insulation effects. Consequently, they are highly suitable for use in insulating and protective clothing.

The compositions of the invention have the advantage, furthermore, that the expanded crosslinked compositions in the elastomer end product exhibit excellent mechanical robustness. For instance, an inventive foam strip with a thickness of 2 mm and an initial hardness of 40 Shore A has a standard elongation at break of 1300%, whereas a comparable strip of CR gives only 300%. In addition, the tension and compression set of silicone, and also its dynamic properties (cf. keypad mats), are known to be very good. Accordingly, vulcanisates formed from the compositions of the invention are superior to CR in their long-term robustness. The compression set of CR at 100° C. is approximately 25%, whereas the compression set of silicone at 100° C. is less than 5%. Consequently, articles produced from the compositions of the invention, such as diving suits, for example, do not undergo permanent deformation, even during long periods of wear, and return to their original geometry within a short time. This hysteresis is much slower in the case of CR, and, depending on the deformation, usually does not end at the starting point. The wear comfort and the shape stability of apparel produced from the compositions of the invention is thus improved in comparison to CR. In addition, even under high compression, such as at a high depth of dive, for instance, the silicone foam of the invention is not permanently compressed and so, in contrast to CR, does not lose its insulating properties.

The compositions of the invention have the advantage, furthermore, that their expanded vulcanisates exhibit a completely homogeneous foam structure and hence homogeneous properties even over very large wall thicknesses, greater than 5 cm, and do so with a smooth, impervious surface.

The compositions of the invention have the advantage that they are halogen-free and therefore do not release toxic combustion products in the event of fire. The calorific potential and smoke gas density of silicones are known to be very low. A low-combustibility formulation of the compositions of the invention is possible by means of suitable additives and fillers. The compositions of the invention are therefore outstandingly suitable as well for the production of protective clothing for—for example—the fire fighting and military segments.

Another advantage of the compositions of the invention is the property of water repellency produced as a result of the high surface energy of silicone, in contrast to CR.

Another decisive advantage of the compositions of the invention is the enormous gas permeability and vapor permeability that are provided through the use of silicone, and hence the breathability of the vulcanisates produced from them. Thus the air permeability of CR at 60° C. is about $70\times10^{-9}$ $cm^2s^{-1}$ $hPa^{-1}$, whereas silicone under the same conditions has a figure of around $3500\times10^{-9}$ $cm^2s^{-1}$ $hPa^{-1}$. The gas permeability of the compositions of the invention, then, is higher by a factor of 40 to 50 than that of CR; the water vapor permeability is even higher still. In conjunction with the aforementioned water repellency of the silicone, accordingly, the material can be said to have a true skinlike breathability, since, in addition to the transport of air, wetness coming from the outside is kept away, but vapor coming from the inside is transported to the outside.

The compositions of the invention have the advantage that they can be prepared in a simple process, using readily available starting materials, and hence economically.

The compositions of the invention likewise have the advantage that they can be crosslinked both with noble metal catalysis and with peroxide induction, since the additives (E) and (F) that are necessary for developing the adhesion, and also the blowing agents (C), are largely insensitive toward peroxides.

The compositions of the invention have the advantage, moreover, that, without the use of pretreatments, primer application or mechanical assistants, and in spite of the reduced contact area as a result of the expansion, they adhere very well to substrates.

The compositions of the invention have the advantage, moreover, that this adhesion is developed very rapidly, typically in the region of minutes for what is referred to as transport adhesion, which is necessary for detachment-free removal from the heating tunnel and destruction-free demolding from a mold, or for the transport of the composite part.

The compositions of the invention have the advantage, moreover, that this transport adhesion is already very high, in some cases within the region of the tensile strength or breaking load of one of the partner materials in the composite.

The compositions of the invention have the advantage, moreover, that the adhesion is usually further strengthened over time, by storage or heating.

The compositions of the invention have the advantage, moreover, that the adhesion does not subside as the material ages, i.e., that the composite does not age ahead of the material.

The compositions of the invention have the advantage, moreover, that the adhesion, as and when needed, is developed even without pressure, i.e., that a composite comes about without pressing or other costly and inconvenient operating steps.

The compositions of the invention have the advantage, moreover, that the crosslinked compositions, on the elastomer end product, exhibit no substantial deterioration in mechanical or other physical properties, even with high fractions of additives (D), (E), and (F), in comparison to compositions which have not been made self-adhesive. This can be explained through the morphological similarity of the additives to the silicone base (A) and (B) and by the pigmentlike insolubility of certain additives in the matrix, which does not lead to adverse side effects or separation effects.

The compositions of the invention have the advantage, moreover, that, given an appropriate choice of additives, their crosslinked vulcanisates can be used in direct contact with foods or even with the skin, with the result that there is no need to use costly and inconvenient additional coatings or carriers in order to avoid direct contact, and hence the compositions themselves may serve as food-use-approved or hypoallergenic coatings on substrates that are not food-appropriate or not suitable for skin contact.

The compositions of the invention have the advantage that, as compared with non-self-adhesive expandable materials, they expand as rapidly and have a similarly low density, in other words, that the additives present do not adversely affect the expansion behavior.

In the examples described below, all references to parts and percentages, unless indicated otherwise, are to the weight. Unless indicated otherwise, the examples below are carried out at the pressure of the surrounding atmosphere, in other words, approximately, at 1000 hPa, and at room temperature, in other words at about 20° C., or at a temperature which comes about when the reactants are combined at room temperature without additional heating or cooling.

EXAMPLES

Substrates

The adhesion of the silicone elastomers of the invention was tested on the following substrates:

Polyamide (PA): Ultramid® A3EG6 (BASF AG)
Aluminum (industrial grade; not primed, not anodized)
Steel: V2A grade steel (industrial grade)

Example 1

Preparation of an Inventive Composition and Simulation of Adhesion on Coextrusion 1000 grams of a poly(dimethyl-methylvinyl)siloxane having an average chain length as determined by $^{29}$Si-NMR of 800 Si—O units (Wacker Chemie AG) are introduced and mixed homogeneously in portions with 240 grams of a hydrophilic silica having a BET surface area of about 300 $m^2/g$ (Wacker Chemie AG) in a sigma kneading device at 120° C. After cooling to RT, 50 grams of a 3:1:1 mixture of tetraethyl silicate, methyltriethoxysilane, and dimethyldiethoxysilane (all Wacker Chemie AG) in solution in 100 ml of ethanol are added, and kneading is continued under reduced pressure at 40° C., until the ethanol has evaporated without residue. Incorporated into the resulting mixture, with kneading, are 18 grams of sodium pyrophosphate and 10 grams of sodium hydrogen carbonate, and also 5 grams of sodium hydrogen sulfate (all Merck KgAA), with cooling. The resulting formulation is then provided with crosslinking additives for vulcanization, on a roll at RT, and applied as a strip to the specimens described below, and, as described below, subjected to vulcanization, and the specimens are tested. The release forces are reported in table 1. In unexpanded form, the composition has an average Shore A ultimate hardness of 70, and vulcanizes at atmospheric pressure to form a homogeneous foam structure having an impervious surface. The foam hardness is about 20 Shore A.

Characterization of the Adhesion of a Specimen Simulating Coextrusion (Produced According to Example 1)

To characterize the adhesive strength, 100.0 g of the elastomer composition prepared in the following examples are applied with a doctor blade or placed in the form of a preform strip, depending on viscosity, in the form of a layer approximately 6 mm thick, to the substrate surface, cleaned with acetone beforehand (size of test specimen approximately 20×60 mm, taped off over about 10 mm at each end, in order to suppress the formation of a composite at that point). The resultant composite is then vulcanized at a temperature of 200° C. for 5 minutes in a forced-air drying cabinet, producing complete expansion and crosslinking of the elastomer material; it is then cooled to room temperature. Using a tensile elongation machine, a measurement is then made of the maximum force required in a peel test to separate elastomer body and substrate body completely from one another, i.e., to part the adhesive bond. The release force is determined in accordance with DIN 53531 and reported in N/mm. For each example, 5 specimens are measured, the rupture stress is determined as an average value, and the fraction of cohesive failure is determined in percent. Cohesive failure of 0% means that the silicone elastomer was detached fully and without residue from the substrate surface. Cohesive failure of 100% (ideal scenario) means that the separation took place exclusively by crack propagation within the silicone elastomer or the substrate.

Example 2

Preparation of an Inventive Composition and Simulation of Adhesion in the Production of Molded Articles The formulation of example 1 is mixed in a dissolver with 22 gram of Glymo (Degussa AG) and 40 grams of an Si—H-containing polydiphenylsiloxane crosslinker (Wacker Chemie AG). The resulting formation is then provided, again in the dissolver, with crosslinking additives for vulcanization, at RT, and vulcanized at 135° C. for 7 minutes in a steel test mold to give moldings having a size of 2×6 cm—with taped-off sections as in example 1. The specimens are then tested. The release forces are reported in table 1. In unexpanded form, the composition has an average Shore A ultimate hardness of 60 and, with the mold filled only to around 50%, exhibits complete filling of the mold as a result of expansion, and a homogeneous foam structure with an impervious surface. The foam hardness is about 10 Shore A.

Table 1 shows the results for the release force in [N/mm] and also the fraction of cohesive failure in [%] for the inventive compositions according to examples 1 and 2, with addition crosslinking using platinum catalysis, expanded onto 3 different substrates.

TABLE 1

| | PA | | Aluminum | | V2A steel | |
|---|---|---|---|---|---|---|
| Example | [N/mm] | [%] | [N/mm] | [%] | [N/mm] | [%] |
| Coextrusion simul. with composition from example 1 | 6.3 | 90 | 8.2 | 100 | 8.0 | 100 |
| Molding with composition from example 2 | 6.5 | 100 | 6.2 | 90 | 6.0 | 90 |

The values reported in table 1 demonstrate the high adhesive strength of coextrudates and composite moldings composed of the inventive addition-crosslinked silicone elastomer and organic plastics or metals, respectively.

Example 3

Preparation of a Foamable and Vulcanizable Silicone Composition which can be Processed for Self-Adhesion to Typical Fiber Types 1000 grams of a poly(dimethyl-methylvinyl)siloxane having an average chain length as determined by $^{29}$Si-NMR of 800 Si—O units (Wacker Chemie AG) are introduced and mixed homogeneously in portions with 240 grams of a hydrophilic silica having a BET surface area of about 300 $m^2/g$ (Wacker Chemie AG) in a sigma kneading device at 120° C.

After cooling to RT, 50 grams of a 3:1:1 mixture of tetraethyl silicate, methyltriethoxysilane, and dimethyldiethoxysilane (all Wacker Chemie AG) in solution in 100 ml of ethanol are added, and kneading is continued under reduced pressure at 40° C., until the ethanol has evaporated without residue. The resulting mixture is provided, on a roll or in a kneading device, with vulcanizing additives for platinum-catalyzed addition crosslinking and also with 12 grams of the water-of-crystallization-based blowing batch ELASTOSIL® AUX BTB (manufacturer: Wacker Chemie AG, Munich).

Example 4

Production of a Semifinished Product (Laminate or Foamed Web) for Further Use in the Apparel Industry The processible mixture from example 3 is homogenized continuously on a calender, brought to a thickness of 0.5 mm, and laminated under gentle applied pressure to an untreated polyester fabric. This laminate is then transported through a hot-air heating tunnel, set at an effective temperature of 160° C.; the residence time in the tunnel amounts to four minutes. The resultant extrudate, laminated to fabric, is foamed homogeneously to a thickness of 1 mm, and undergoes optimum direct adhesion to the fabric, with the result that separation can be accomplished only with destruction of the rubber and/or the fabric.

Example 5

Production of a Thin, Double-Sidedly Textile-Laminated Silicone Foam Sheet for Manufacturing Wet Suits (Diving, Surfing, Swimming Suits)

The processible mixture from example 3 is homogenized continuously on a calender, brought to a thickness of 0.6 mm, and laminated under gentle applied pressure from above to an untreated polyamide/elastan (Lycra®DuPont). Directly following this, a further web of lycra is applied from above to the laminate, under gentle applied pressure, with the aid of a roller (roll). This is followed by transport through a hot-air heating tunnel, set at an effective temperature of 170° C.; the residence time in the tunnel amounts to five minutes. The double-sidedly fabric-laminated extrudate obtained is foamed homogeneously to a thickness of 1.1 mm, and undergoes optimum direct adhesion to both fabrics.

Example 6

Production of a Foamable and Vulcanizable Silicone Composition of Low Combustibility, and Production of a Laminate Using this Composition A mixture according to example 3 is mixed, shortly before further processing, with 2% of ELASTOSIL® AUX SB-2 (manufacturer: Wacker Chemie AG, Munich), mixing taking place homogeneously and on a roll. The mixture is brought on a roll to a sheet thickness of 1 mm. It is then passed together with a polyaramide fabric web (Twaron®, Teijin-Twaron), pretreated with ELASTOSIL® LR 3153 (Wacker Chemie AG, Munich), through the roll neck, so that the sheet goes onto the fabric. The laminate is stored in a heating oven at 250° C. for 7 minutes. After cooling, a standard test strip is cut from the resultant foam laminate, 2 mm thick, and the strip is tested in accordance with UL 94. The laminate exhibits a classifiability of UL 94 V-0 at 2 mm (very low combustibility) and is therefore suitable for use in fire protection clothing.

The invention claimed is:

1. A foamable, crosslinkable silicone composition which cures to a silicone foam, comprising (A) at least one organosilicon compound bearing radicals suitable for crosslinking;

(B) at least one silica reinforcing filler selected from the group consisting of fumed and precipitated silica, the silica being treated or untreated;

(C) at least one blowing agent, (D) at least one crosslinking system selected from the group consisting of condensation crosslinking, peroxide-induced addition crosslinking, and noble metal complex-catalyzed addition crosslinking, the crosslinking system suitable for crosslinking with the organosilicon compound (A);

(E) at least one silane of formula (1) $R^2R^3SiR^4R^5$, wherein $R^2$, $R^3$, $R^4$, and $R^5$ are a substituent of the formula —$OR^6$ where $R^6$ is hydrogen or an organic radical, (F) at least one compound of the formula (2)

$$R^8R^9(R^{10}O)Si—OR^{11},$$

wherein $R^8$ and $R^9$ independently are organic substituents or a linear or branched siloxane having 1-10 Si—O units, and $R^{10}$ and $R^{11}$ independently are organic substituents, wherein at least one blowing agent (C) is a compound containing intercalated liquid or liquid of crystallization, the blowing agent (C) selected from the group consisting of salts, silicates, proteins, and sugars, and wherein the blowing agent (C) is effective to foam said crosslinkable composition during vulcanization of the crosslinkable silicone composition.

2. The silicone composition of claim 1, wherein (A) is an aliphatically unsaturated organosilicon compound.

3. A process for preparing a silicone composition of claim 1, comprising mixing components (A) to (E) uniformly with one another.

4. A process for preparing a silicone composition of claim 2, comprising mixing components (A) to (E) uniformly with one another.

5. A process for producing expanded crosslinked products from the silicone composition of claim 1, comprising crosslinking and expanding through extrusion, calendering, overmolding, mold casting, compression molding, laminating, or adhesive bonding.

6. A process for producing expanded crosslinked products from the silicone composition of claim 2, comprising crosslinking and expanding through extrusion, calendering, overmolding, mold casting, compression molding, laminating, or adhesive bonding.

7. Expanded crosslinked products produced by crosslinking and expanding the silicone composition of claim 1.

8. Expanded crosslinked products produced by crosslinking and expanding the silicone composition of claim 2.

9. An expanded laminate prepared by crosslinking and expansion of a silicone composition of claim 2, prepared by a) laminating, b) adhesive bonding, or c) laminating and adhesive bonding, the steps a), b) and c) being practiced once or in any combination, including a plurality of repetitions to produce a multi-layer article.

10. The silicone composition of claim 1, wherein the organosilicon compound (A) is an organopolysiloxane bearing at least one aliphatically unsaturated crosslinking group, and the crosslinking system comprises an organic peroxide free radical initiator.

11. The silicone composition of claim 1, wherein at least one of $R^{10}O$ or $OR^{11}$ is selected from the group consisting of methoxy, ethoxy, and acetoxy groups.

12. The silicone composition of claim 1, which foams during the cure of the composition.

13. The silicone composition of claim 12, which foams while curing at a temperature of 40° C. to 200° C.

14. The silicone composition of claim 1, wherein the blowing agent is an inorganic blowing agent selected from the group consisting of sodium pyrophosphate, sodium hydrogen carbonate, sodium hydrogen sulfate, and mixtures thereof.

15. A laminate comprising at least one expanded, crosslinked composition comprising:

a crosslinked silicone composition comprising, prior to crosslinking, (A) at least one organosilicon compound bearing radicals suitable for crosslinking;

(B) at least one silica reinforcing filler selected from the group consisting of fumed and precipitated silica, the silica being treated or untreated;

(C) at least one blowing agent, (D) at least one crosslinking system selected from the group consisting of condensation crosslinking, peroxide-induced addition crosslinking, and noble metal complex-catalyzed addition crosslinking, the crosslinking system suitable for crosslinking with the organosilicon compound (A);

(E) at least one silane of formula (1) $R^2R^3SiR^4R^5$, wherein $R^2$, $R^3$, $R^4$, and $R^5$ are independently a substituent of the formula —$OR^6$ where $R^6$ is hydrogen or an organic radical, (F) at least one compound of the formula (2)

$R^8R^9(R^{10}O)Si—OR^{11}$, wherein $R^8$ and $R^9$ independently are organic substituents or a linear or branched siloxane having 1-10 Si—O units, and $R^{10}$ and $R^{11}$ independently are organic substituents, wherein at least one blowing agent (C) is a compound containing intercalated liquid or liquid of crystallization, the blowing agent (C) selected from the group consisting of salts, silicates, proteins, and sugars, and wherein the blowing agent (C) is effective to foam said crosslinkable composition during vulcanization of the crosslinkable silicone composition.

16. The laminate of claim 15, wherein the expanded, crosslinked composition is laminated to a textile on both sides.

17. The laminate of claim 15 which is a wearing apparel.

18. The laminate of claim 15 which is a diving suit.

* * * * *